United States Patent [19]

Dattilo

[11] 3,779,561

[45] Dec. 18, 1973

[54] CARTRIDGE LOCKING MECHANISM FOR A TAPE PLAYER

[75] Inventor: Donald J. Dattilo, Mount Prospect, Ill.

[73] Assignee: Motorola Inc., Franklin Park, Ill.

[22] Filed: Nov. 8, 1972

[21] Appl. No.: 304,686

[52] U.S. Cl. .................................................. 274/4 B
[51] Int. Cl. .............................................. G11b 5/00
[58] Field of Search .................. 274/4 R, 4 B, 11 R, 274/11 B; 179/100.2 Z

[56] References Cited

UNITED STATES PATENTS 3,716,243 2/1973 O'Neal ................................ 274/4 B
3,485,500 12/1969 Loeschner et al.................. 274/4 B

*Primary Examiner*—Harry N. Haroian
*Attorney*—Vincent J. Rauner et al.

[57] ABSTRACT

A cartridge locking mechanism for use in a tape player including a chassis having at least one wall connected at opposite ends to side walls extending perpendicular thereto to form a cartridge receiving cavity having an open end through which a cartridge is received, includes an actuator bar member mounted on the one wall for movement in the direction of insertion of a cartridge into the cavity. A portion of the actuator bar member extends into the cavity for engagement with a cartridge inserted thereinto. The actuator bar member is spring biased toward the open end of the cavity. A second bar member is also mounted on the one wall for movement transverse the movement of the actuator bar member and includes a roller mounted on the end thereof farthest from the actuator bar member, for receipt in a groove formed in a side wall of the cartridge received in the cavity. The second bar member is spring biased toward the actuator bar member. Adjacent ends of the bar members normally are engaged so that the second bar member is held against the spring bias applied thereto with the roller being maintained outside of the cavity while no cartridge is inserted into the cavity. Insertion of the cartridge into the cavity in engagement with the actuator bar portion, moves the actuator bar member against the spring biasing force there-against to release the second bar for movement in the direction of the actuator bar member so that the roller is moved into engagement with the cartridge side wall and into the groove therein. A cam surface on the end of the second bar member engaging the actuator bar member provides gradual movement of the second bar member so that the roller is moved into engagement with the side wall of the cartridge substantially at the time the groove is aligned therewith. Withdrawal of the cartridge from the cavity forces the roller from the groove, thereby to move the second bar member against the spring biasing force to permit the return of the actuator bar member to its normal position.

9 Claims, 4 Drawing Figures

CARTRIDGE LOCKING MECHANISM FOR A TAPE PLAYER

BACKGROUND

This invention relates generally to cartridge locking mechanisms for use in cartridge type tape players and more particularly to such locking mechanisms which are designed for use in tape players having relatively small overall dimensions.

Many different types of cartridge locking mechanisms are now being used in cartridge type tape players for removably securing a tape cartridge in the player during the playback and/or recording of information on the tape encapsulated within the cartridge. For the most part, these mechanisms are mounted along a side wall of the player chassis which forms a cartridge receiving cavity and include a cartridge retaining member which is inserted into the last-mentioned cavity upon insertion of a cartridge thereinto for engagement with a side wall of the cartridge. Such a cartridge locking mechanism is shown in co-pending U.S. Pat. Application, Ser. No. 107,201 filed on Jan. 18, 1971 in the name of Donald V. O'Neal, and assigned to the same assignee as the instant application.

The above mentioned type of locking mechanism, for the most part, utilizes considerable space within the player. In the case wherein the mechanism is mounted on the side wall of the player chassis, additional space within the player housing must be allotted and thus the player itself must be wider dimensionally.

With the advent of new, mini-players, locking mechanisms previously used in cartridge type tape players may be too large for use therein, requiring space not available in these new mini-players.

SUMMARY

Accordingly, it is a primary object of the instant invention to provide a new and improved cartridge locking mechanism requiring a minimum of space and which is well suited for use in the new, smaller tape players.

It is another object of the present invention to provide a new and improved cartridge locking mechanism which has relatively few moving parts, which is reliable in operation, simple in construction and relatively inexpensive to fabricate.

Briefly, a preferred embodiment of the cartridge locking mechanism according to the invention includes a pair of elongated bar members, both mounted for sliding movement along a common wall of the tape player chassis forming an upper or lower wall of the cartridge receiving cavity of the player.

A first, actuator bar member is mounted for movement in the direction of insertion and withdrawal of a tape cartridge received in the cartridge receiving cavity. The actuator bar member is spring biased toward the open end of the cartridge receiving cavity and includes on a first end thereof an arm portion extending substantially perpendicular to the member and into the cavity in the path of a cartridge inserted thereinto, for engagement therewith. The other bar member is mounted for movement along a path transverse the movement of the first bar member and includes a cartridge retaining roller on one end thereof. The roller extends from the bar member for receipt in a V-groove provided in a side wall of a cartridge inserted into the cavity. The last-mentioned member is spring biased toward the actuator bar member. The last-mentioned member normally engages the other bar member to hold the roller mounted thereon outside the cavity. The mating end of one of the bar members is inclined to form a cam surface for engagement with the corresponding end of the other bar member. Thus, upon insertion of a cartridge into the player, the first-mentioned actuator bar member is engaged thereby and moved in the direction of insertion of the cartridge. Movement of the first-mentioned member permits the other member to be moved also so that the roller mounted thereon enters the cartridge receiving cavity and engages the side wall of the cartridge. The roller is received in the V-groove formed in he side wall of the cartridge to retain the latter in a play position in the cavity.

Upon withdrawal of the cartridge, the roller is forced out of the V-groove to return the bar members to their original positions.

DETAILED DESCRIPTION

Figure 1:
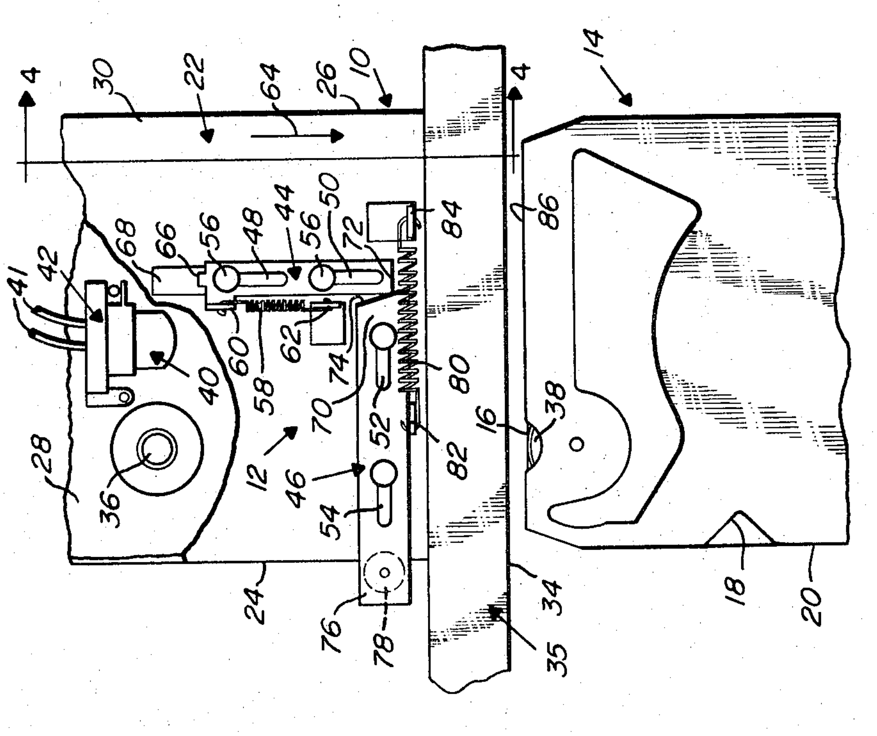
FIGS. 1–3 are bottom, plan views of a cartridge type tape player including a cartridge locking mechanism shown in various stages of operation, according to the invention.

Referring now to the drawings in greater detail wherein like numerals have been used throughout the various views to designate similar parts, there is illustrated in FIGS. 1–4, a cartridge type tape player designated generally by the numeral 10, in which cartridge locking mechanism 12 according to the invention is employed.

The cartridge tape player 10 is adapted to receive and play a tape cartridge 14 of the usual kind having a recorded, multi-track tape 16 mounted therein and a notch or V-groove 18 formed along a side wall 20 thereof.

The tape player includes a chassis 22 having a pair of side walls 24, 26 interconnected by top and bottom walls 28, 30 to form a cavity 32 (See FIG. 4) having a mouth or open end 34 through which the cartridge 14 is received. A front bezel or plate 35 is attached to the chassis 22 and surrounds open end 34 thereof. A housing (not shown) can be fitted over the chassis 22 and attached to the bezel 35 to complete the tape player structure. It should be noted that the tape player chassis is illustrated with the bottom wall 30 extending upwardly to better show the cartridge locking mechanism 12 according to the invention. In actual use of the tape player, the wall 30 of the chassis 22 would be facing downwardly.

Mounted on the tape player chassis between the upper and lower walls 28, 30, thereof, in communication with cavity 32, is a capstan shaft 36 against which a pressure roller 38 mounted in the tape cartridge 14 and over which the tape 16 passes, is pressed. The capstan shaft is driven in the usual manner by a motor and pulley arrangement (not shown) to move tape 16, sandwiched between the capstan shaft and pressure roller upon full insertion of the cartridge into the player, through the cartridge and past a magnetic tape head 40, also mounted on chassis 22 in communication with the cartridge receiving cavity 32.

Magnetic tape head 40 is mounted by means of a bracket assembly 42, designed to move the tape head in a plane adjacent the tape 16 in a direction transverse the movement of the tape for the purpose of selectively playing back information on certain ones of the various tracks on the tape. The tape bracket rides along a pin 44 extending between walls 28 and 30 of the player chassis. Apparatus (not shown) is provided to automatically position the tape head with respect to the various tape tracks. Electrical leads 41 extending from the tape head 40, connect to circuitry (not shown) for operation of the tape head.

The cartridge locking mechanism 12 according to the invention, is mounted on surface 43 of bottom wall 30 of the tape player chassis, facing away from the cartridge receiving cavity 32. The mechanism is mounted as described to accommodate the groove 18 in a side wall of tape cartridge 14. However, with minor adjustments, the mechanism 12 could be mounted on the top wall 28 of the player chassis with equally good success in operation and still fall within the scope of the instant invention.

The cartridge locking mechanism 12 comprises a first actuator bar member 44 and a second bar member 46, both of which are mounted for sliding movement on surface 43 of bottom wall 30. Each of the bar members includes a pair of slots 48, 50 and 52, 54, respectively, through which fasteners such as rivets 56, extend to retain the members in a mounted relation on wall 30. Actuator bar member 44 is mounted for sliding movement in the direction of insertion and withdrawal of the tape cartridge 14 into and out of cavity 32 of the player, respectively. A coil spring 58 coupled between a tab 60 extending from bar member 44 and a stationary tab 62 extending from chassis wall 30, biases the bar member in the direction of arrow 64 (FIG. 1) toward the open end 34 of the player cavity. At the end farthest from the open end 34 of cavity 32 of bar member 44, there is provided a depending arm portion 66, which extends into cavity 32 for engagement with a cartridge received therein. A slot 68 in wall 30 is provided to permit movement of arm portion 66 in accordance with the insertion and withdrawal of the cartridge 14.

The other bar member 46 is mounted for movement along surface 43 of wall 30, transverse the movement of bar member 44. In the drawings, the bar member 46 is shown mounted for movement substantially perpendicular to the movement of bar member 44, but can be mounted at an angle with bar member 44 other than 90° and still function within the scope of the invention.

A first end 70 of the bar member 46 is positioned adjacent end 72 of bar member 44 and is inclined to form a cam surface 74 for engagement with end 72 of bar member 44. The cam surface 74, as will be described hereinafter, controls the rate of movement of bar member 46 during insertion of a cartridge 14 in the player cavity. While the cam surface 74 is shown herein as being provided at the end 70 of bar member 46, it can as well be provided on end 72 of bar member 44 and still operate properly in accordance with the instant invention.

At the opposite end 76 of bar member 46, positioned away from actuator bar member 44, there is mounted a cartridge retaining roller 78. The roller as will be described, is provided for receipt in the groove 18 in side wall 20 of the cartridge 14 upon insertion of the latter into cavity 32, to retain the cartridge in playing position with respect to the tape head and capstan shaft.

Figure 2:
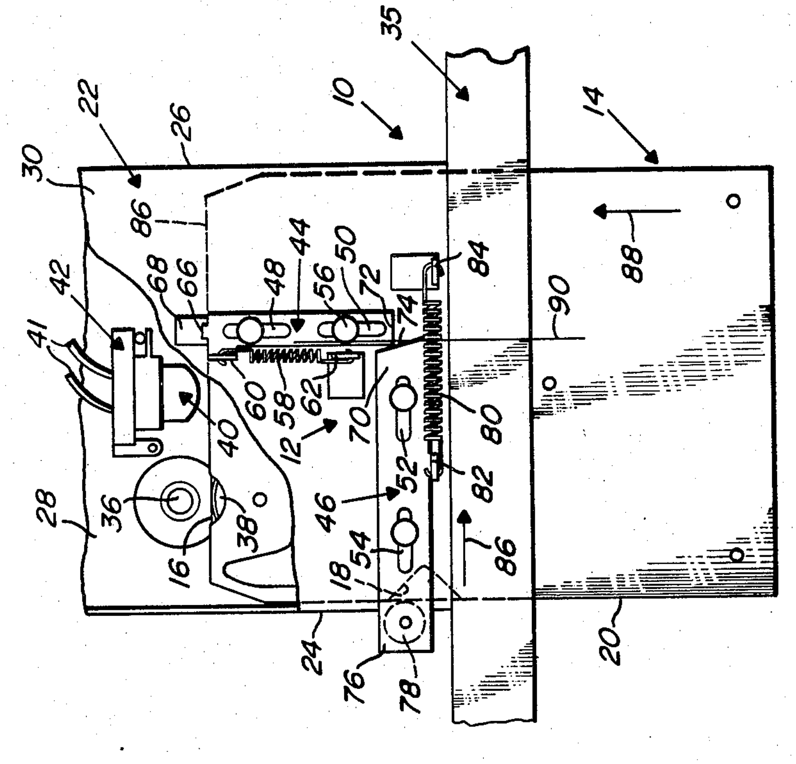
Figure 3:
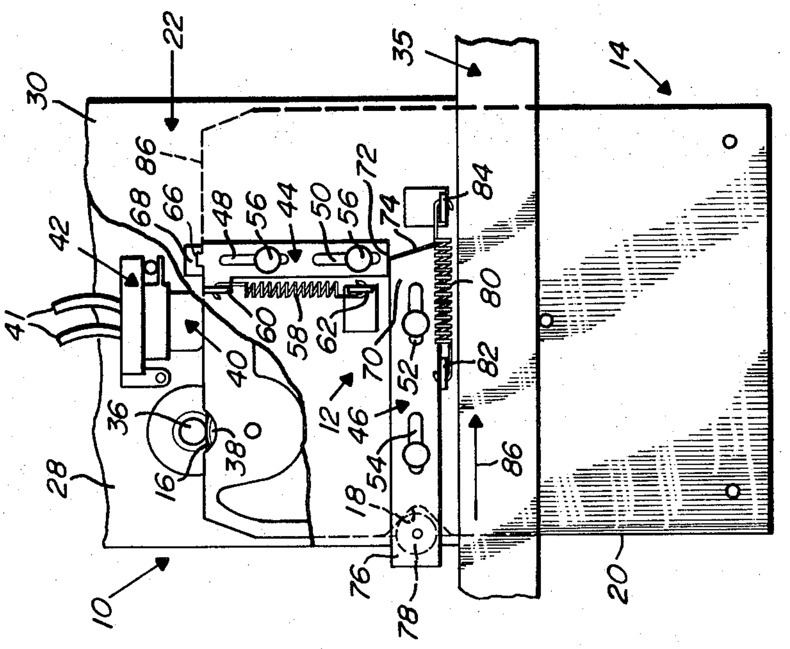
Figure 4:
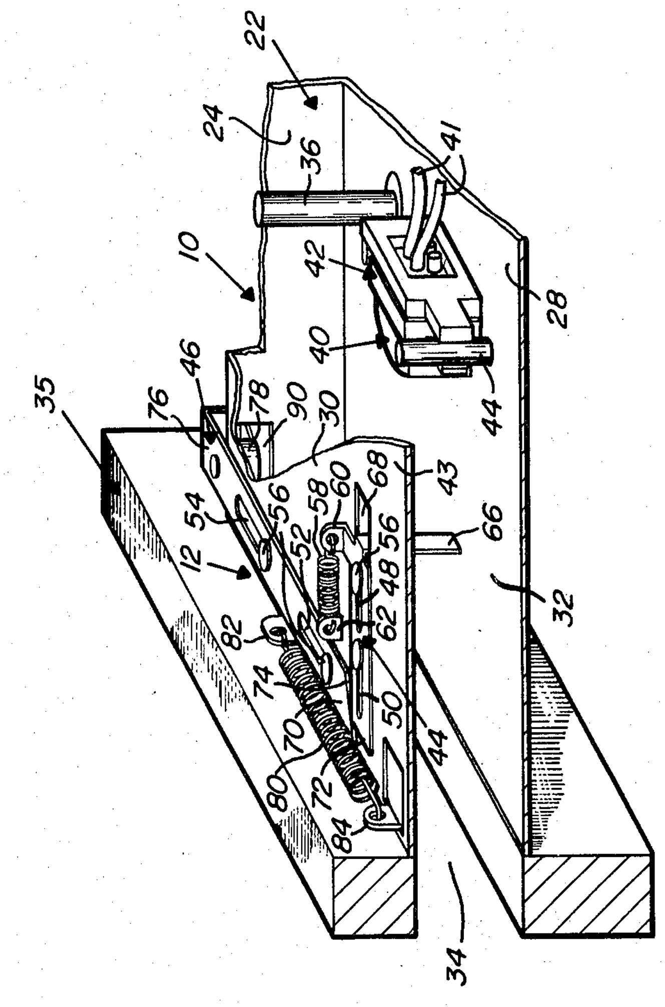
FIG. 4 is a fragmentary, perspective view of the cartridge tape player of FIGS. 1–3, illustrating in greater detail the cartridge locking mechanism according to the invention.

A coil spring 80, coupled between a tab 82 extending from bar member 46 and a stationary tab 84 extending from chassis wall 30, biases the bar member 46 toward actuator bar member 44, in the direction of arrow 86 (See FIGS. 2 and 3).

Referring now to FIGS. 1–3 of the drawings, the operation of the cartridge locking mechanism 12 according to the invention will be described. Prior to the insertion of cartridge 14 into cavity 32, the bar members 44, 46 are positioned as shown in FIG. 1. End 72 of actuator bar member 44 is in engagement with the inclined surface 74 of bar member 46, at the high point of the incline, to maintain bar member 46 in a first position, held against the force of coil spring 80, with roller 78 being situated outside of the cartridge receiving cavity 32. Biasing spring 58 attached to actuator bar member 44 maintains the bar members positioned as desired prior to the insertion of a cartridge into cavity 32.

Upon insertion of a cartridge into the cavity, the front wall 86 of the cartridge engages arm portion 66 of actuator bar member 44. Further insertion of the cartridge in the direction of arrow 88 (FIG. 2) moves actuator bar member 44 against the force of biasing spring 58 toward the tape head 40 adn capstan shaft 36. As bar member 44 is moved, coil spring 80 pulls against bar member 46 to move it in the direction of arrow 86 (FIGS. 2 and 3). The rate of movement of bar member 46 is dependent upon the angle of incline of cam surface 74 with respect to an imaginary line 90 (FIG. 2) extending parallel to the bar member 44. A greater angle with respect thereto permits bar member 46 to move more rapidly in the direction of arrow 86 in response to the movement of bar member 44. The angle of incline is chosen preferably so that roller 78 will be at a position for entering the V-groove 18 in the cartridge side wall when the latter groove is substantially aligned with the roller. The last-mentioned angle, however, is not critical since if the angle is too great and roller 78 should enter the cavity 32 prior to the time that the V-groove 18 becomes aligned with the roller, the latter will merely engage the side wall 20 of the cartridge and roll therealong until the groove 18 assumes a position whereat roller 78 can be moved thereinto.

Complete insertion of cartridge 14 into cavity 32 moves end 72 of actuator bar member 44 out of the path of bar member 46. Spring 80 is then free to move the last-mentioned bar member fully in the direction of actuator bar member 44 whereby roller 78 is inserted through aperture 92 in side wall 24 of the player chassis, into the V-groove 18 in the side wall 20 of cartridge 14 (see FIG. 3) and pressed against the wall forming the groove to secure the cartridge in the play position.

When it is desired to remove the cartridge from the cavity 32, the cartridge is pulled in a direction opposite arrow 88. Roller 78 is thus forced out of the groove 18 against the baising force of spring 80, thereby permitting spring 58, which is then under tension, to return bar member 44 in the direction of arrow 64 (FIG. 1) to its original position. End 72 of bar member 44 engages cam surface 74 of bar member 46, and forces the last-mentioned bar member to be moved against spring 80 in a direction opposite from arrow 86 (See FIGS. 2 and 3), to return the roller 78 to a position outside the cavity 32. Cartridge 14 is thereby free for removal from cavity 32. After removal of the cartridge 14 from the cavity 32, the bar members 44, 46 assume their normal positions illustrated in FIG. 1 of the drawings.

While a particular embodiment of the invention has been shown and described, it should be understood that the invention is not limited thereto since many modifications may be made. It is therefore comtemplated to cover by the present application any and all such modifications as fall within the true spirit and scope of the appended claims.

I claim:

1. A cartridge locking mechanism for use in a tape player having a chassis with at least one wall connected at opposite sides thereof to side walls extending substantially perpendicular thereto, to form a cavity having an open end for receiving a tape cartridge having a groove formed in a side wall thereof and instrumentalities for driving and playing the recording tape in said cartridge upon the insertion of the cartridge through said open end into said cavity, said cartridge locking mechanism including in combination: a first, actuator member mounted on said one wall for movement in the direction of insertion and withdrawal of said cartridge in said cavity, said actuator member including an arm portion extending into said cavity in the path of a cartridge to be received therein, first resilient biasing means biasing said actuator member normally toward the open end of said cavity, a second member also mounted on said one wall for movement transverse the direction of movement of said actuator member, said second member having a cartridge engaging roller mounted on a first end thereof for receipt in the groove in the side wall of said cartridge upon insertion of the latter into said cavity, second resilient biasing means biasing said second member toward said first, actuator member, the end of said first actuator member nearest the open end of said cartridge receiving cavity normally engaging the second end of said second member to maintain said member in a position whereat said roller is held outside of said cavity, against the resilient biasing force applied to said second member, one of said last-mentioned ends of said first and second members including an inclined cam surface engaging the other of said last-mentioned ends of said first and second members, said cam surface cooperating with said other end to permit said second member to be moved at a rate determined by the incline of said cam surface, in the direction of said first actuator member in response to the movement of said last-mentioned actuator member away from the open end of said cartridge receiving cavity upon insertion of a cartridge into said cavity, whereby said roller is moved into the groove formed in the side wall of said cartridge to maintain said cartridge in said cavity.

2. A cartridge locking mechanism as claimed in claim 1 wherein upon withdrawal of said cartridge from said cavity, said roller is forced from said groove to move said second member away from said actuator member, against said second resilient biasing means and wherein simultaneously therewith, said actuator member is returned by said first resilient biasing means to said normal position for engagement with said second member to maintain said roller outside of said cavity.

3. A cartridge locking mechanism as claimed in claim 1 wherein said cam surface is formed at the second end of said second member, said cam surface being inclined at an angle less than 90° with respect to an imaginary line extending parallel to the direction of movement of said actuator member.

4. A cartridge locking mechanism as claimed in claim 3 wherein said second member is mounted for movement along a path substantially perpendicular to the direction of movement of said actuator member.

5. A tape player for playing a tape cartridge having a recording tape mounted therein for movement therethrough and a groove formed in a side wall thereof, said tape player comprising a chassis having a pair of side walls interconnected by a third wall to form an open ended cavity for receiving said cartridge, means for driving the tape within said cartridge when the cartridge is inserted in said cavity, a magnetic tape head engageable with said tape when said cartridge is in the inserted position in said cavity for playing said tape and a cartridge locking mechanism for removably securing said tape cartridge in said inserted position in said cavity, comprising; an actuator bar member mounted on said third wall on the surface thereof opposite said cavity, for movement along a path parallel to the direction of insertion of the cartridge in said cavity, said actuator bar member including an end portion formed at substantially a right angle with respect to said actuator bar member and extending through an aperture in said wall into said cavity in the path of a cartridge received therein, a first spring member connected to said actuator bar member biasing said last-mentioned member toward the open end of said cavity, a second bar member mounted on said one wall on said surface opposite said cavity, for movement along a path transverse the movement of said actuator bar member, said second bar member including a cartridge retaining roller mounted on a first end thereof for receipt in the groove in the cartridge wall upon insertion of said cartridge into said cavity, a second spring member connected to said second bar member, biasing said second bar member toward said actuator bar member, the end of said actuator bar member nearest the open end of said cartridge receiving cavity engaging the second end of said second bar member in a first relation prior to the insertion of a cartridge into said cavity to maintain said member in a position whereat said roller is held outside of said cavity against the biasing force applied by said second spring member to said second bar member, one of said last-mentioned ends of said actuator bar and second bar members including an inclined cam surface engaging the other of said last-mentioned ends, said cam surface co-operating with said other of said last-mentioned ends to permit movement of said second bar member toward said actuator bar member at a rate determined by the incline of said cam surface in response to the movement of said last-mentioned actuator bar member away from the open end of said cartridge receiving cavity upon the insertion of a cartridge into said cavity, whereby said roller is received in the groove formed in the side wall of said cartridge for maintaining said cartridge in said cavity.

6. A tape player as claimed in claim 5 wherein said cam surface is formed at the second end of said second bar member and is inclined at an angle less than 90° with respect to an imaginary line extending parallel to the direction of movement of said actuator member.

7. A tape player as claimed in claim 6 wherein said actuator bar and second bar members of said cartridge locking mechanism are mounted on the third wall of said chassis at substantially right angles with respect to each other, each of said bar members including a pair of elongated slots formed therein through which fasteners extending through said wall, extend to secure said bar members to said wall, respectively, said actuator bar and second bar members thereby being slidable along said wall surface.

8. A cartridge locking mechanism for use in a tape player having a chassis with at least one wall connected at opposite sides thereof to side walls extending substantially perpendicular thereto to form a cavity having an open end for receiving a tape cartridge having a groove formed in a side wall thereof and instrumentalities for driving and playing a recording tape located in said cartridge upon the insertion of the cartridge through said open end into said cavity, said cartridge locking mechanism including in combination: a first actuator member mounted on said one wall for movement in the direction of insertion and withdrawal of said cartridge in said cavity, said actuator member including an arm portion extending into said cavity in the path of a cartridge received therein, first spring means biasing said actuator member toward the open end of said cavity, a second member also mounted on said one wall for movement along a path transverse the direction of movement of said first, actuator member, said second member including on a first end thereof, a roller for receipt in the groove in the side wall of said cartridge upon insertion of the latter into said cavity, second spring means biasing said second member toward said first actuator member to move the second end of said second member into engagement with the end of said actuator member nearest the open end of said cartridge receiving cavity, said actuator member holding said second member against the force of said second spring means to maintain said roller outside of said cavity while no cartridge is present in said cavity, said second member being released for movement toward said first actuator member in response to the movement of said last-mentioned actuator member away from the open end of said cavity upon engagement of said arm portion by the cartridge inserted into said cavity, whereby said roller is moved into the groove formed in the side wall of said cartridge to maintain said cartridge in an inserted position in said cavity and wherein one of said engaging ends of said actuator and second members includes a cam surface, said cam surface being inclined and engaging said end of said other member to permit a predetermined rate of movement of said second member in the direction of said actuator member upon insertion of a cartridge into said cavity, thereby to move said roller into said groove substantially at the time said groove is aligned with said roller during insertion of said cartridge.

9. A cartridge locking mechanism as claimed in claim 8 wherein said cam surface is formed at the end of said second member and is inclined at an angle less than 90° with respect to an imaginary line extending in the direction of movement of said actuator member and wherein said roller is forced from said groove upon withdrawal of said cartridge from said cavity to move said second member in a direction away from said actuator member to permit said actuator member to return to said normal position, thereby to maintain said second member in a position whereat said roller is held outside of said cavity.

* * * * *